Patented Sept. 12, 1950

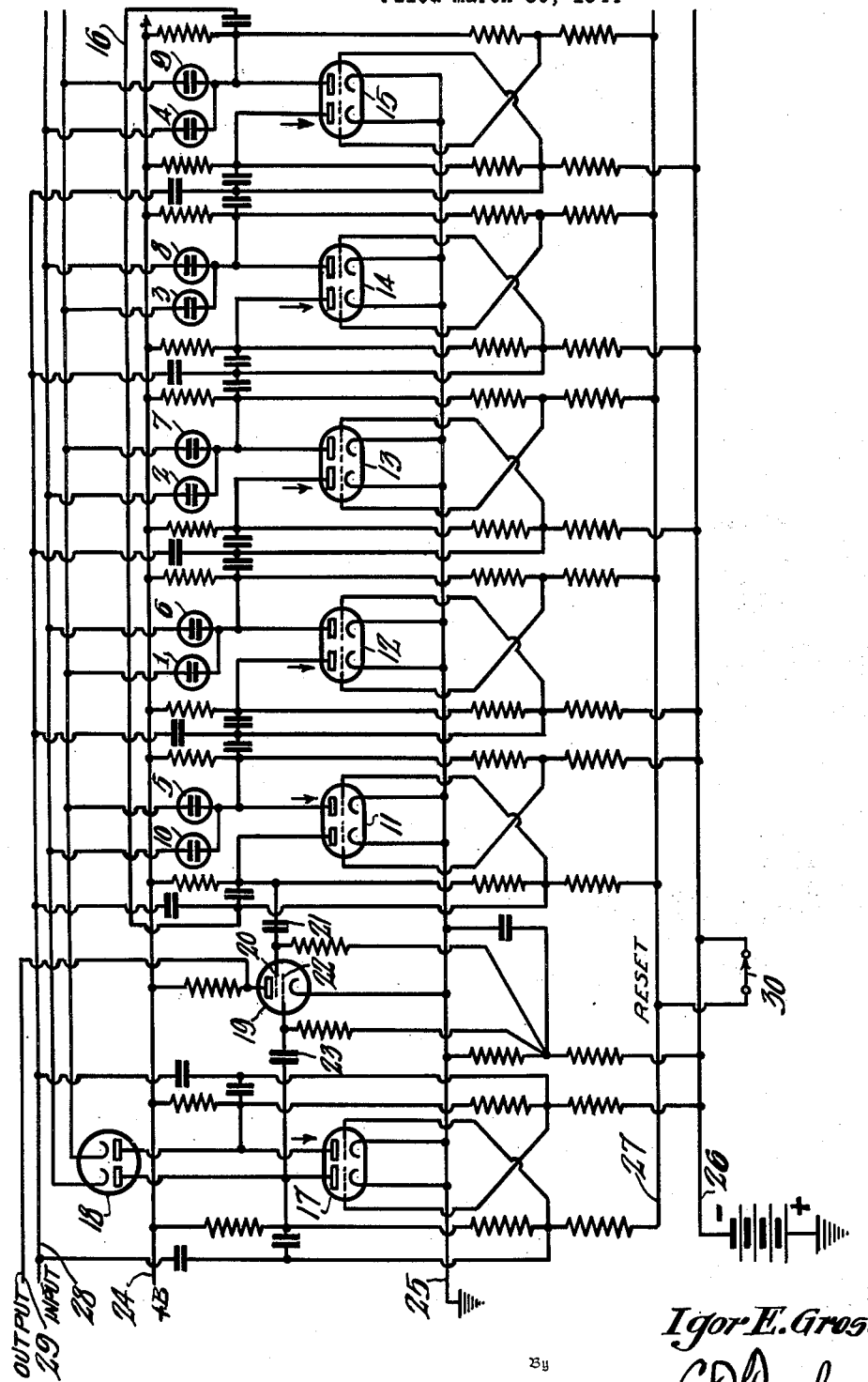

2,521,787

UNITED STATES PATENT OFFICE 2,521,787

COMPUTING SYSTEM

Igor E. Grosdoff, Princeton, N. J., assignor to Radio Corporation of America, a corporation of Delaware Application March 30, 1944, Serial No. 528,721

6 Claims. (Cl. 235—92)

This invention relates to computing systems of the electronic type, and has for its principal object the provision of an improved apparatus and method of operation whereby a number of electric pulses may be counted with less apparatus than that heretofore required for the purpose. A further object is the provision of means whereby an indication is produced only when a predetermined number of such pulses have been registered.

The illustrated form of the invention includes a number of trigger circuit units connected in a closed loop and a single trigger circuit which is separate from this loop. The pulses to be counted are applied both to the single trigger circuit and to the trigger circuits connected in the closed loop. Each trigger circuit in the loop has associated with it a pair of indicators, such as neon lamps or the like.

The single trigger circuit functions in response to the applied pulses to select one or the other lamp of a pair of the indicators. The trigger circuits of the loop operate successively to register the applied pulses on the selected indicator.

Connected between the single trigger circuit and the loop is an output tube provided with two control grids, so connected that they both receive positive pulses simultaneously only when pulses have been registered on all the indicators, each trigger circuit in the loop having been utilized to register two pulses. Thus the circuit may include, for example, a loop containing five trigger circuits which register the first five pulses successively on the first indicator of each pair and the second five pulses on the second indicator of each pair.

Only in response to the application of ten pulses, or some multiple of ten pulses, are both grids of the output tube simultaneously at a positive potential. When this happens, a pulse is delivered to an output lead connected to the anode of the output tube. It is apparent that more or fewer trigger circuits may be connected in the closed loop and that the single trigger circuit may be replaced by a plurality of trigger circuits connected in a closed loop, depending on the character of indication desired.

The expression "closed loop" is used hereinafter to designate a circuit in which a plurality of trigger circuit units, or the equivalent, are each similarly coupled to two other trigger circuit units to form a closed loop.

The invention will be better understood from the following description considered in connection with the accompanying drawing, and its scope is indicated by the appended claims.

The single figure of the drawing is a wiring diagram of a computing system to which the invention has been applied.

This system includes a plurality of trigger circuits 11 to 15, which are connected through a lead 16 to form a closed loop. Connected to the right anode of each trigger circuit is a pair of indicator lamps 5—10, 1—6, 2—7, 3—8 and 4—9. Potential is applied to these indicator lamps from a trigger circuit 17 through a duo diode 18. An output tube 19 has one control grid 20 which is coupled through a capacitor 21 to the left anode of the trigger circuit 11, and another control grid 22 which is coupled through a capacitor 23 to the left anode of the trigger circuit 17.

Potential for operation of the trigger circuits and the output tube is applied between the terminals 24 and 25, the latter of which is grounded and connected to the various cathodes. From a terminal 26, a negative bias potential is applied to the left grids of the trigger circuits 17 and 11, to the right grids of the trigger circuits 12, 13, 14 and 15, and to both grids of the output or control tube 19. A reset switch 30 is normally closed to apply negative bias potential to other grids of the various trigger circuits and is opened to establish a standby condition under which current flows in the various trigger circuits, as indicated by arrows. The pulses to be counted are applied to a terminal 28 and every tenth of these pulses is delivered at a terminal 29.

Assuming a standby condition to have been established by opening and closing the switch 30 with the current of the trigger circuits, as indicated by arrows, both grids of the tube 19 are at a negative potential sufficient to make the tube nonconductive unless both grids receive a positive signal; the left anode of the duo diode 18 is then at a relatively high potential; the lamp 10 is lighted; the lamps 1 to 9 are unlighted, because their lower terminals are at substantially the same potential as the bus connected to the terminal 24; and the lamp 5 is unlighted, because the right anode of the duo diode 18 is at a relatively minus potential.

The application of a negative pulse to the terminal 28 transfers current conductivity from the right to the left side of the trigger circuit units 17 and 11 and from the left to the right side of unit 12. Under these conditions, both grids of the output tube 19 are more negative, the right-hand anode of the duo diode 18 is more positive, and the lamp 1 is lighted. Lamps 5, 7, 3 and 9 also connected to the same diode as the lamp 1 and lamps 10, 6, 2, 8 and 4 connected to the other diode are not lighted for the reason that the left hand sides of the units 11, 13, 14 and 15 are conducting current. In turning over, unit 11 applies a positive pulse to the right grid of unit 12, thus transferring current from its left to its right anode and unit 12 then becomes sensitive to the next negative pulse from the lead 28 to be turned back to its standby condition. Consider lamps 10, 2, 8 and 4, which are connected between positive anodes and the left cathode of double diode 18. They do not light even though the left anode of trigger circuit 17 is positive, because the left diode of 18 cannot conduct a current in a reverse direction.

The application of a second pulse to the terminal 28 transfers current to the right side of the unit 17, to the left side of the unit 12, and to the right side of unit 13. The result is that the left anode of 17 and the output tube grid 22 are more positive and the lamp 2 is lighted.

A third pulse applied to the terminal 28 transfers current to the left side of the units 17 and 13 and to the right side of the unit 14, resulting in the lighting of the lamp 3.

The lamps 4 to 10 are similarly lighted, one after another, in response to the application of successive pulses to the terminal 28. Only when the tenth pulse is applied are both control grids 20 and 22 of the output tube 19 subjected to a positive pulse, thus permitting the tube 19 to take current and applying a negative pulse to the output terminal 29.

The various steps in the operation of the system are readily ascertained from the following tabulation which is self-explanatory:

| Pulse No. | Unit 11 | Unit 12 | Unit 13 | Unit 14 | Unit 15 | Unit 17 | Lamp On |
|---|---|---|---|---|---|---|---|
| Standby | R | L | L | L | L | R | 10 |
| 1 | L | R | L | L | L | L | 1 |
| 2 | L | L | R | L | L | R | 2 |
| 3 | L | L | L | R | L | L | 3 |
| 4 | L | L | L | L | R | R | 4 |
| 5 | R | L | L | L | L | L | 5 |
| 6 | L | R | L | L | L | R | 6 |
| 7 | L | L | R | L | L | L | 7 |
| 8 | L | L | L | R | L | R | 8 |
| 9 | L | L | L | L | R | L | 9 |
| 10 | R | L | L | L | L | R | 10 |
| 11 | L | R | L | L | L | L | 1 |

The basic features of the present invention are a plurality of trigger circuits connected in a closed loop, separate trigger circuit means which may consist of one or more trigger circuits, and means connected between the loop and separate trigger circuit means for delivering an output pulse in response to a number of applied pulses which is a multiple of the number of trigger circuits in the loop.

I claim as my invention:

1. The combination of a plurality of trigger circuits each including a pair of electron discharge elements having their grids each cross-connected to the anode of the other so that current conduction is stable in either one or the other of said elements, terminals for simultaneously applying input pulses to all of said trigger circuits, means interconnecting some of said trigger circuits so that their current conductive conditions are successively changed in response to the application of said input pulses, and an electron discharge element having at least two grid electrodes, said electron discharge element having one grid connected to one of said interconnected trigger circuits and another grid connected to one of the electron discharge elements of the other of said trigger circuits to deliver an output pulse in response to a predetermined current conductive condition of said trigger circuits to which said electron discharge element grids are connected.

2. The combination of a plurality of trigger circuits each including a pair of electron discharge elements having their grids each cross-connected to the anode of the other so that current conduction is stable in either one or the other of said elements, terminals for simultaneously applying input pulses to all of said trigger circuits, means interconnecting some of said trigger circuits so that their current conductive conditions are successively changed in response to the application of said input pulses, a plurality of pairs of indicators, means connecting said indicator pairs each to the anode of an electron discharge element of a different one of said interconnected trigger circuits, and means including the other of said trigger circuits for selecting said indicators one after the other in response to said input pulses.

3. The combination of a plurality of trigger circuits each including a pair of electron discharge elements having their grids each cross-connected to the anode of the other so that current conduction is stable in either one or the other of said elements, terminals for simultaneously applying input pulses to all of said trigger circuits, means interconnecting all but one of said trigger circuits so that their current conductive conditions are successively changed in response to the application of said input pulses, an electron discharge element having at least two grids, one of said grids being coupled to one of the electron discharge elements of one of said interconnected trigger circuits, the other of said grids being coupled to one of the electron discharge elements of said one trigger circuit, and means to apply a bias to said two-grid element to render it responsive only when both elements of said trigger circuits to which it is coupled have the same conductive condition, said two-grid element delivering an output pulse only in response to input pulses of a number which is twice that of the number of said interconnected trigger circuits.

4. The combination of a plurality of trigger circuits each including a pair of electron discharge elements having their grids each cross-connected to the anode of the other so that current conduction is stable in either one or the other of said elements, terminals for simultaneously applying input pulses to all of said trigger circuits, means interconnecting some of said trigger circuits so that their current conductive conditions are successively changed in response to the application of said input pulses, a plurality of pairs of indicators, means connecting said indicator pairs each to the anode of an electron discharge element of a different one of said interconnected trigger circuits, and means including the other of said trigger circuits for selecting said indicators one after the other in response to said input pulses and means responsive to the conductive conditions of said trigger circuits for delivering an output pulse only in response to input pulses of a number which is twice that of the number of said interconnected trigger circuits.

5. The combination of first and second trigger circuits each including a pair of triodes having their grids each cross-connected to the anode of the other so that current conduction is stable in either one or the other of said triodes, a pair of indicators connected to the anode of a single triode of the first of said trigger circuits, and a pair of diodes each connected between a different one of said indicators and the anode of a different triode of said second trigger circuit.

6. The combination of first and second trigger circuits each including a pair of triodes having their grids each cross-connected to the anode of the other so that current conduction is stable in either one or the other of said triodes, a pair of indicators connected to the anode of a single triode of the first of said trigger circuits, a pair of diodes each connected between a different one of said indicators and the anode of a different triode of said second trigger circuit, and means connected between an anode of the first of said trigger circuits and an anode of the second of said trigger circuits for delivering a pulse in response to both of the anodes interconnected through said means becoming non-conductive.

IGOR E. GROSDOFF.

REFERENCES CITED

The following references are of record in the file of this patent:

UNITED STATES PATENTS

| Number | Name | Date |
| --- | --- | --- |
| 2,158,285 | Koch | May 16, 1939 |
| 2,272,070 | Reeves | Feb. 3, 1942 |
| 2,306,386 | Hollywood | Dec. 29, 1942 |
| 2,404,047 | Flory et al. | July 16, 1946 |
| 2,405,664 | Mumma | Aug. 13, 1946 |
| 2,410,156 | Flory | Oct. 29, 1946 |
| 2,422,698 | Miller | June 24, 1947 |

FOREIGN PATENTS

| Number | Country | Date |
| --- | --- | --- |
| 355,705 | Great Britain | Aug. 24, 1931 |